(12) United States Patent
M'Raihi

(10) Patent No.: US 9,258,124 B2
(45) Date of Patent: Feb. 9, 2016

(54) TIME AND EVENT BASED ONE TIME PASSWORD

(75) Inventor: David M'Raihi, San Carlos, CA (US)

(73) Assignee: Symantec Corporation, Mountain View, CA (US)

(*) Notice: Subject to any disclaimer, the term of this patent is extended or adjusted under 35 U.S.C. 154(b) by 563 days.

(21) Appl. No.: 11/407,996

(22) Filed: Apr. 21, 2006

(65) Prior Publication Data

US 2007/0250923 A1    Oct. 25, 2007

(51) Int. Cl.
*G06F 21/34* (2013.01)
*H04L 9/32* (2006.01)
*H04L 9/08* (2006.01)
*H04L 9/12* (2006.01)

(52) U.S. Cl.
CPC .............. *H04L 9/3242* (2013.01); *G06F 21/34* (2013.01); *H04L 9/0863* (2013.01); *H04L 9/12* (2013.01); *H04L 9/3228* (2013.01); *H04L 9/3234* (2013.01)

(58) Field of Classification Search
USPC ............................... 726/18; 713/184; 380/262
See application file for complete search history.

(56) References Cited

U.S. PATENT DOCUMENTS

| | | | |
|---|---|---|---|
| 5,023,908 A | 6/1991 | Weiss | |
| 5,168,520 A | 12/1992 | Weiss | |
| 5,448,045 A | 9/1995 | Clark | |
| 5,661,807 A | 8/1997 | Guski et al. | |
| 5,768,373 A | 6/1998 | Lohstroh et al. | |
| 5,802,176 A * | 9/1998 | Audebert ...................... | 713/184 |
| 5,841,871 A | 11/1998 | Pinkas | |
| 5,887,065 A * | 3/1999 | Audebert ...................... | 713/172 |
| 6,044,155 A * | 3/2000 | Thomlinson et al. ......... | 713/155 |
| 6,067,621 A | 5/2000 | Yu et al. | |
| 6,292,896 B1 | 9/2001 | Guski et al. | |
| 6,370,649 B1 | 4/2002 | Angelo et al. | |
| 6,829,356 B1 | 12/2004 | Ford | |
| 7,058,180 B2 | 6/2006 | Ferchichi et al. | |
| 7,069,438 B2 | 6/2006 | Balabine et al. | |
| 7,318,235 B2 | 1/2008 | Grawrock | |
| 7,805,377 B2 | 9/2010 | Felsher | |
| 7,904,946 B1 * | 3/2011 | Chu et al. ......................... | 726/5 |
| 7,921,455 B2 | 4/2011 | Lin et al. | |
| 8,087,074 B2 | 12/2011 | Popp et al. | |
| 8,434,138 B2 | 4/2013 | Popp et al. | |

(Continued)

FOREIGN PATENT DOCUMENTS

| | | |
|---|---|---|
| JP | H11/282982 A | 10/1999 |
| JP | 2000-508099 A | 6/2000 |

(Continued)

OTHER PUBLICATIONS

D. M'Raihi, M. Bellare, F. Hoornaert, D. Naccache, O. Ranen, Request for Comments: 4226, Dec. 2005, 1-37.*

(Continued)

*Primary Examiner* — Christopher Revak
(74) *Attorney, Agent, or Firm* — Wilmer Cutler Pickering Hale and Dorr LLP

(57) ABSTRACT

A system and method for generating a One Time Password (OTP) based upon a value TEC that can change based both upon the occurrence of an event and the passage of time. The OTP can be computed at a token and sent to a verifier. The verifier stores exact or estimated parameters necessary to compute one or more expected OTPs from the token, including TEC. The value TEC can be synchronized between the token and the verifier.

33 Claims, 2 Drawing Sheets

(56) References Cited

U.S. PATENT DOCUMENTS

| | | | |
|---|---|---|---|
| 8,984,602 B1* | 3/2015 | Bailey et al. | 726/6 |
| 8,990,905 B1* | 3/2015 | Bailey et al. | 726/5 |
| 9,002,750 B1* | 4/2015 | Chu et al. | 705/72 |
| 2003/0105964 A1* | 6/2003 | Brainard et al. | 713/178 |
| 2003/0163569 A1 | 8/2003 | Panasyuk et al. | |
| 2003/0212894 A1 | 11/2003 | Buck et al. | |
| 2003/0217288 A1 | 11/2003 | Guo et al. | |
| 2004/0034773 A1 | 2/2004 | Balabine et al. | |
| 2004/0044896 A1 | 3/2004 | Kelley et al. | |
| 2004/0059952 A1 | 3/2004 | Newport et al. | |
| 2004/0172535 A1 | 9/2004 | Jakobsson et al. | |
| 2005/0010758 A1 | 1/2005 | Landrock et al. | |
| 2005/0239440 A1 | 10/2005 | Chen et al. | |
| 2006/0034238 A1 | 2/2006 | Inoue et al. | |
| 2006/0041756 A1 | 2/2006 | Ashok et al. | |
| 2006/0041759 A1 | 2/2006 | Kaliski et al. | |
| 2006/0059344 A1* | 3/2006 | Mononen | 713/171 |
| 2006/0174105 A1 | 8/2006 | Park | |
| 2006/0208066 A1 | 9/2006 | Finn et al. | |
| 2007/0033265 A1 | 2/2007 | Anderson et al. | |
| 2007/0033642 A1 | 2/2007 | Ganesan et al. | |
| 2009/0313687 A1 | 12/2009 | Popp et al. | |
| 2009/0316903 A1* | 12/2009 | Jeung | 380/271 |
| 2010/0191977 A1 | 7/2010 | Landrock et al. | |
| 2011/0197266 A1* | 8/2011 | Chu et al. | 726/5 |
| 2012/0210408 A1* | 8/2012 | Lu et al. | 726/6 |
| 2013/0268444 A1* | 10/2013 | Namgoong et al. | 705/71 |

FOREIGN PATENT DOCUMENTS

| | | |
|---|---|---|
| JP | H11/316740 A | 6/2000 |
| JP | 2001-067320 A | 3/2001 |
| JP | 2001-175599 A | 6/2001 |
| JP | 2001-509295 A | 7/2001 |
| JP | 2001-509922 A | 7/2001 |
| JP | 2001-352324 A | 12/2001 |
| JP | 2002-259344 A | 9/2002 |
| JP | 2003-256373 A | 12/2003 |
| JP | 2004-515117 A | 5/2004 |
| JP | 2004-524605 A | 8/2004 |
| JP | 2007-503646 A | 2/2007 |
| WO | 97/36221 A1 | 10/1997 |
| WO | 99/18546 A1 | 4/1999 |
| WO | 02/43309 A2 | 5/2002 |
| WO | 02/48846 A2 | 6/2002 |
| WO | 2005/022288 A3 | 3/2005 |
| WO | 2005/083610 A1 | 9/2005 |
| WO | 2006/044717 A2 | 4/2006 |

OTHER PUBLICATIONS

Neil M. Haller, "The S/KEY One-Time Password System," Proceedings of the Symposium on Network and Distributed System Security 1994, pp. 151-157.

IETF Network Working Gioup, "The S/KEY One-Time Password System," RFC 1760, Feb. 1995.

IETF Network Working Group, "A One-Time Password System," RFC 1938, May 1996.

IETF Network Working Group, "OTP Extended Responses," RFC 2243, Nov. 1997.

IETF Network Working Group, "A One-Time Password System," RFC 2289, Feb. 1998.

IETF Network Working Group, "The One-Time-Password SASL Mechanism," RFC 2444, Oct. 1998.

Alex Biryukov et al., "Cryptanalysis of the Alleged SecurID Hash Function (extended version)," 2003.

RSA, "RSA SecurID Authenticators," 2006.

M. Bellare, et al, "Keying Hash Functions for Message Authentication", Proceedings of Crypto '96, Jan. 25, 1996, LNCS vol. 1109, pp. 1-15.

Krawczyk et al, "HMAC: Keyed-Hasing for Message Authentication", EITF Network Working Group, RFC 2104, Feb. 1997, pp. 1-11, http://www.ietf.org/rfc2104.txt retrieved Jan. 21, 2011.

D. Eastlake, 3rd, et al, "Randomness Recommendations for Security", EITF Network Working Group, RFC 1750, Dec. 1994, pp. 1-30.

S. Bradner, "Key words for use in RFCs to Indicate Requirement Levels", EITF Network Working Group, RFC 2119, Mar. 1997, pp. 1-3.

S. Bradner, "Intellectual Property Rights in EITF Technology", EITF Network Working Group, RFC 3668, Feb. 2004, pp. 1-14, http://www.faqs.org/rfcs/rfc3668.html retrieved Oct. 17, 2005.

OATH, "Initiative for Open Authentication", http://www.openauthentication.org/ retrieved Oct. 17, 2005.

B. Preneel et al., "MDx-MAC and Building Fast MACs from Hash Functions", Advances in Cryptology Crypto '95, Lecture Notes in Computer Science, vol. 963, D. Coppersmith ed., Springer-Verlag, 1995.

R. Merritt, "Crack in SHA-1 code 'stuns' security gurus"; EETimes Online, Feb. 21, 2005, http://www.eetimes.com/ showArticle.jhtml?arricleID-F60402150 retrieved Oct. 17, 2005, pp. 1-4.

B. Schneier, "SHA-1 Broken", Schneier on Security, Feb. 15, 2005, 24 pp., http://www.schneier.com/blog/ archives/2005/02/sha1_broken.html retrieved Oct. 17, 2005.

R. Lemos, "Researchers: Digital encryption standard flawed", CNET News.com Feb. 16, 2005, 5 pp., http://news.com. com/Researchers+Digital+encryption+standard+flawed/2100-1002$_{13}$ 3-55 retrieved Oct. 17, 2005.

A. Shamir, "How to Share a Secret", Communications of the ACM, vol. 22, No. 11, pp. 612-613, Nov. 1979.

RSA Security, "RSA Securid Authenticators", Product Brochure, 2004, pp. 1-2.

Haller et al., "A One-Time Password System", EITF Network Working Group, RFC 2282, Feb. 1998, pp. 1-20, http://www.faqs.org/rfcs/rfc2298.html retrieved Jan. 21, 2011.

FIPS Pub 198, Federal Information Processing Standards Publication, "The Keyed-Hash Message Authentication Code (HMAC)", Information Technology Laboratory, U.S. Department of Commerce, Mar. 6, 2002, 20 pp.

Kaliski et al, "Password Protection Module", Jun. 22, 2004, U.S. Appl. No. 60/584,997 filed Jun. 2, 2004.

International Search Report and Written Opinion for PCT/US05/37113 mailed Jul. 24, 2006.

International Search Report and Written Opinion for PCT/US07/07483 mailed Jul. 28, 2008.

* cited by examiner

TIME AND EVENT BASED ONE TIME PASSWORD

RELATED APPLICATIONS

This application is cross-referenced with U.S. Provisional Patent Appln. 60/618,600 filed on Oct. 15, 2004 and PCT Application No. PCT/US05/37113, filed on Oct. 17, 2005.

FIELD OF THE INVENTION

The field of the invention is authentication, in particular authentication using one-time passwords.

BACKGROUND OF THE INVENTION

A user can be authenticated using a token that stores a secret shared only with an authentication service. The token generates a one-time password ("OTP") for each authentication based upon the shared secret and other values. When the OTP is received at the authentication service, the service calculates at least one expected OTP value and compares it to the received OTP value. If they match, the user is authenticated. Otherwise, the user is not authenticated.

An OTP can be automatically, periodically generated based upon the shared secret and a value that changes as a function of time. For example, a new OTP can be automatically generated every minute based upon the shared secret and a value that corresponds to the date and time of day. The authentication service calculates a series of expected OTPs based upon the shared secret and a range of date/time values meant to encompass the date/time value used at the token. This takes into account any drift between the clock on the token and the clock at the service that causes the token and service to be out of synchronization. If one of the OTPs calculated at the service match the received OTP, then the user is authenticated. Security is enhanced because one of parameters used to calculate the OTP changes over time, making it difficult to guess.

An OTP can be calculated based upon the shared secret and a characteristic of an event. For example, the characteristic of an event can be the value of a counter that is incremented each time the user pushes a button on the token. The authentication service calculates a range of OTPs based upon the shared secret and counter values beginning at the last known counter value at the token. This takes into account button-pushes that resulted in OTPs that were not sent to the service. If one of the OTPs calculated at the service match the received OTP, then the user is authenticated.

Numerous algorithms are known for generating OTPs, including the HOTP algorithm, which is specified in RFC 4226. The following symbols can be used in describing the HOTP algorithm.

| Symbol | Represents |
| --- | --- |
| C | 8-byte counter value, the moving factor. This counter MUST be synchronized between the HOTP generator (prover) and the HOTP validator (verifier). |
| K | shared secret between prover and verifier; each HOTP generator has a different and unique secret K. |
| Digit | number of digits in an HOTP value; system parameter. |

The HOTP algorithm is based on an increasing counter value and a static symmetric key known only to the token and the validation service. In order to create the HOTP value, we will use the HMAC-SHA-1 algorithm, as defined in RFC 2104. As the output of the HMAC-SHA-1 calculation is 160 bits, we must truncate this value to something that can be easily entered by a user.

$$HOTP(K,C) = \text{Truncate}(HMAC\text{-}SHA\text{-}1(K,C))$$

where "Truncate" represents the function that can convert an HMAC-SHA-1 value into an HOTP value. The Key (K), the Counter (C), and Data values can be hashed high-order byte first. The HOTP values generated by the HOTP generator can be treated as big endian.

Generating an OTP can be done in the 4 following steps:
Step 1: Generate an HMAC-SHA-1 value
Let HS=HMAC-SHA-1(K,C)//HS is a 20-byte string
Step 2: Generate a 4-byte string (Dynamic Truncation)
Let Sbits=DT(HS)//DT, defined below, returns a 31-bit string
Step 3: Compute an HOTP value
Let Snum=StToNum(Sbits)//Convert S to a number in 0 . . . $2^{\{31\}}-1$
Return D=Snum mod10^Digit//D is a number in the range 0 . . . 10^{Digit}-1

The Truncate function can perform Step 2 and Step 3, i.e., the dynamic truncation and then the reduction modulo 10^Digit. The dynamic offset truncation technique can extract a 4-byte dynamic binary code from a 160-bit (20-byte) HMAC-SHA-1 result.

DT(String)//String=String[0] . . . String[19]
  Let OffsetBits be the low-order 4 bits of String[19]
  Offset=StToNum(OffsetBits)//0<=OffSet<=15
  Let P=String[OffSet] . . . String[OffSet+3]
  Return the Last 31 bits of P Masking the most significant bit of P can avoid confusion about signed vs. unsigned modulo computations. Different processors can perform these operations differently, and masking out the signed bit can remove ambiguity.

RFC 4226 requires implementations to extract a 6-digit code at a minimum and possibly 7 and 8-digit code. This requirement can be violated under different circumstances, although the result may not be compliant with the RFC. Depending on security requirements, Digit=7 or more should be considered in order to extract a longer HOTP value result.

Here is an example of using this technique for Digit=6, i.e., a 6-digit HOTP value is calculated from the HMAC value. The following code example describes the extraction of a dynamic binary code given that hmac_result is a byte array with the HMAC-SHA-1 result:

```
    int offset = hmac_result[19] & 0xf;
    int bin_code = (hmac_result[offset] & 0x7f) << 24
        | (hmac_result[offset+1] & 0xff) << 16
        | (hmac_result[offset+2] & 0xff) << 8
        | (hmac_result[offset+3] & 0xff);
SHA-1 HMAC Bytes (Example)
```

```
-----------------------------------------------------------
| Byte Number |
-----------------------------------------------------------
|00|01|02|03|04|05|06|07|08|09|10|11|12|13|14|15|16|17|18|19|
-----------------------------------------------------------
| Byte Value |
-----------------------------------------------------------
|1f|86|98|69|0e|02|ca|16|61|85|50|ef|7f|19|da|8e|94|5b|55|5a|
-----------------------------*********-----------------++|
```

The last byte (byte 19) has the hex value 0x5a.
The value of the lower 4 bits is 0xa (the offset value).
The offset value is byte 10 (0xa).
The value of the 4 bytes starting at byte 10 is 0x50ef7f19, which is the dynamic binary code DBC1.
The MSB of DBC1 is 0x50 so DBC2=DBC1=0x50ef7f19.

HOTP=DBC2 modulo 10^6=872921.

The dynamic binary code can be treated as a 31-bit, unsigned, big-endian integer; the first byte is masked with a 0x7f. This number can then be taken modulo 1,000,000 (10^6) to generate the 6-digit HOTP value 872921 decimal.

A disadvantage of using a counter value as an input to compute an OTP is that it can remain the same for a long period of time. For example, if a user does not use his token for several months, the counter value will persist at the same value for the entire period of time between uses. Under certain circumstances, this may allow a third party sufficient time to analyze the token, guess the exact or approximate value of the counter and possibly compromise the security of the authentication system.

DETAILED DESCRIPTION

Figure 1:
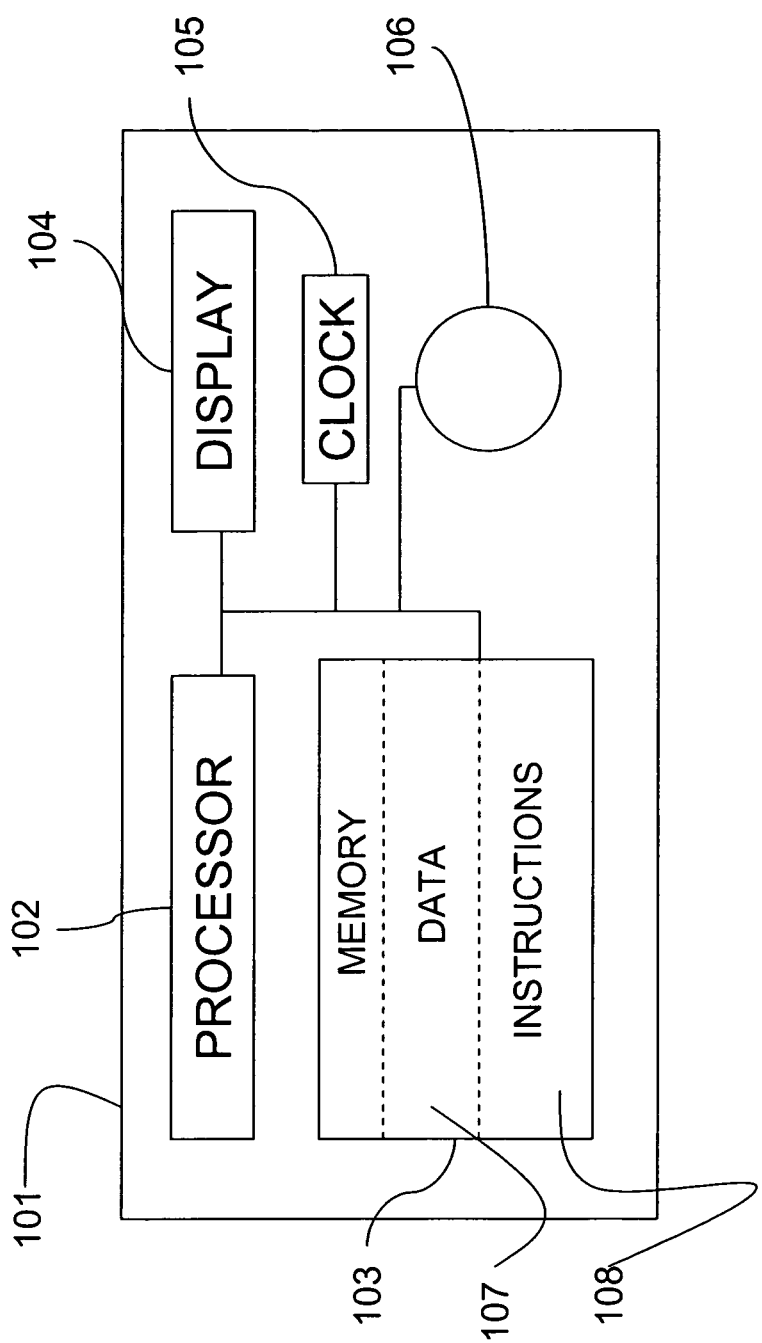
FIG. 1 shows an apparatus in accordance with an embodiment of the present invention.

In accordance with an embodiment of the present invention, the counter value C can be changed as a function of time. Any suitable function of time may be used. A counter C that is changed based upon the occurrence of an event and based upon the passage of time is called a Time and Event-based Counter or TEC. For example, $$TEF = F(X, Y, W, Z)$$

where F is any suitable function or other mapping, X is the size of the time-based increment of TEC, Y is related to the frequency with which increment X is added to TEC, W is the size of the even-based increment of TEC and Z is the number of occurrences that need to occur before TEC is incremented by W. Note that X and W may be positive or negative numbers and that, in the general case, TEC may be an integer or any other kind of suitable number. For example, TEC can be incremented by X every Y seconds both at the prover (e.g., a token) and at the verifier (e.g., an authentication service.) Likewise, TEC can be incremented by W every Z occurrences of an event E or events from a set of events {E}. An actual OTP value can be computed at the token after an event that increments TEC. For example, TEC can be incremented by 1 every 60 seconds in the background as follows:

| Time | Event | TEC | OTP Calculation |
| --- | --- | --- | --- |
| 23:41:00 | None | 341 | None |
| 23:42:00 | None | 342 | None |
| 23:43:00 | None | 343 | None |
| 23:43:17 | Button Push | 344 | 872921 |
| 23:44:00 | None | 345 | None |

This example shows a linear function for incrementing TEC, but any suitable function or mapping for X and Y may be used.

$$X = G(X_i), i = 1, 2 \ldots$$

$$Y = H(Y_j), j = 1, 2, \ldots$$

$X_i$ and $Y_j$ may be numbers or variables. For example, X may be modulo 8 of a function of the shared secret, Y may be equal to modulo 10 of a pseudorandom number that can be generated at the prover and verifier. X and/or Y could be based upon the intermediate or final results of previous OTP computations, e.g., by using all or part of the last byte from the full value computed for the previous OTP, e.g., the value before truncation. For instance, the last byte (byte 19) of the previous HMAC computation can be stored after each computation and used for this purpose.

X and Y can also be determined in other ways. For example, Y could be based upon a system parameter, such as the value of a clock at the prover. Different token families could have different time steps. A token for accessing a bank account could operate with a smaller value for Y, e.g., 2 or 3 minutes, but a token for accessing an email account could operate with a larger value, e.g., 30 minutes.

TEC can be incremented "in the background" at both the prover and the verifier. Any suitable event may trigger the incrementation of TEC and computation of the OTP. For example, an OTP value can be computed at the token when the button on the token is pressed. Likewise, a token may be a "soft token" implemented as a java applet in a mobile phone, in an application running on a PC, etc. In these cases, the event triggering a computation of an OTP can include depressing a given key on a cell phone keypad or computer keyboard, pressing a sequence of keys, pushing a special button, the scanning of a biometric, etc. Similarly, an OTP can be triggered by the selection of an item on a toolbar in a graphical user interface displayed on a screen, by the selection of an item on a pulldown menu, by the activation of an application program, by the activation of a feature of an application program, or by any other suitable event.

The initial value of TEC at the prover can be 1 or any other suitable value. The initial value of TEC can be set by the user, set by the authentication service, set by an application program, set by an authorized third party, etc. When the initial value at the prover is set, the initial value (or information sufficient to derive the initial value) should be sent to the verifier. In this way, the verifier can synchronize its value of TEC for the prover with the value of C at the prover itself. A default value can be specified for the value of TEC absent any new setting of TEC. Initial and default values may be similarly set for X and Y. Initial values can be kept secret as between the prover and verifier.

The prover and verifier should be synchronized and also possibly re-synchronized. In one embodiment, the clock can start incrementing TEC when the token is activated. In another embodiment, the clock can start incrementing TEC when the token is manufactured; a resynchronization pass can occur when the token is activated with the validation service. There can be a simple process for starting the clock, incrementing the value and computing the OTP value, such as depressing the button for 5 full seconds, pushing the button four times within three seconds, etc. The verifier can calculate a set of candidate OTPs for a given prover based upon the verifier's last known prover value TEC and present time known by the verifier. A range around these last known values can be used. If a verifier-computed OTP matches an OTP received from a prover, the verifier can update and store the values for TEC and time for that prover.

In accordance with embodiments of the present invention, an OTP can be generated by incrementing a value TEC based upon the occurrence of an event and incrementing this value based upon the passage of time. The OTP can be determined based upon TEC. The OTP can also be computed based upon TEC and an adjunct value, "AV". This adjunct value AV can be a shared secret, such as a cryptographic key, a password, etc. AV can be based upon secret and public information. Such public information can be a challenge, a question, etc. TEC can be incremented based upon the occurrence of any suitable event, such as the pressing of a button, selecting a dialog box, meeting of a condition (e.g., correctly responding to a challenge), etc. The passage of time can be measured by a value T that can be different for each application. TEC can be incremented after T seconds, T minutes, etc. TEC can also be incremented by a value TI, where after T seconds, TEC can be incremented by TI. For example, after T=60 seconds TEC can be incremented by TI=1. TEC can be controlled by a value EI, where after each event E occurs, TEC can be incremented by EI. For example, after the user presses a button, TEC can be incremented by EI=3. In one embodiment, the one time password is computed using the algorithm specified in RFC 4226.

In accordance with embodiments of the present invention, a user can activate a token by connecting to an activation web site. The activation web site can authenticate the user using any suitable technique, e.g., by requesting and verifying a username and password. The user can also provide any suitable additional information, such as a token identifier, token serial number, associated credentials, etc. This information can be used (along with one or more OTP values generated by the token and sent to the activation web site) to prove that he does in fact has the particular token. The token (e.g., the token identifier) can thus be linked to a specific user (e.g., username) and can initiate the storage and/or updating of a time value in the token, e.g., based upon data generated by the token clock. Alternatively, the clock signal can originate from outside of the token. The time value can help the verifier to determine the time difference between the moment when the user obtains an OTP value and the time at which the OTP value is received at the verifier.

An embodiment of the invention can also compute an HOTP value based upon Counter (C), Key (K) and an adjunct value (AV). Adjunct value AV can be based upon a private secret (e.g., a private key), a shared secret (e.g., a password) or a combination of a secret (private or shared) and some public information. Public information is any information that is not a shared or private secret. An example of public information is a user identifier, a challenge, an answer to a question, etc.

A time window can be set for a token or set of tokens. A re-synchronization of a token can occur when the time elapsed between the actual generation of the OTP (on the token) and the reception of the OTP value by the verifier is longer than a time window that has been set for a particular token or set of tokens. When a token is turned off, e.g., when a soft token on a Cell phone, PC, etc., the soft token value has to be re-synchronized with the verifier value. Let the device with the soft token be switched off at time T0 and be dormant until it is switched back on at time T1. Let t be the time period for incrementing TEC by EI. For example, value TEC is increment by EI every t seconds. A re-synchronization can be performed as follows:
 1—Compute T=T1−T0
 2—Compute Count=Floor(T/t)*EI
 3—Increment TEC by Count
 4—Resynch the token clock (with respect to the differential T)

After this resynchronization procedure, TEC is normally incremented by EI every t period of time.

Another TEC-based resynchronization method can be used whenever the prover can send the OTP value but also other information, and more specifically the TEC value.

The prover can send his OTP (denoted OTP.prover) and TEC (denoted TEC.prover) values and the OTP can act as a short message authentication code of TEC. The verifier can resynchronize within a certain range of values determined by an upper bound value of TEC (denoted TEC.bound) as a system parameter. The verifier can accept the OTP if the following are all true, where TEC.verifier is the verifier's present value of TEC that is associated with the prover:
 1. Prover can send OTP.prover and TEC.prover
 2. Verifier can check that TEC.prover≥TEC.verifier
 3. Verifier can check that (TEC.prover−TEC.verifier)≤TEC.bound
 4. Verifier can check that OTP.prover is correct for TEC.prover
 5. If true, the verifier can set TEC.verifier to TEC.prover After this resynchronization procedure, TEC is normally incremented by EI for every t period of time that elapses. Likewise, the same or a similar protocol can be used to resynchronize the TEC value at the prover.

Even when a device is not turned off, the clock on the device can drift away from being synchronized with other clocks, e.g., with clocks at verifiers. One way to resynchronize without specific intervention from the end users is to maintain a "window" around the normal value of TEC. When a verifier receives an OTP from a token, e.g. an OTP calculated at the token and sent to the verifier, it can compute the expected value of TEC based upon its stored parameters for the sending token, e.g., the present number of event occurrences for that token (e.g., the number of times the button has been pushed on that token, based, for example, on the number of OTP verification requests received by the verifier thus far for that token), the time, etc. Recognizing that its stored parameters may be slightly inaccurate in relation to the parameters at the token used to generate the OTP, the verifier can calculate several candidate OTPs based upon a range of magnitudes of parameters near the expected magnitudes for those parameters. For example, the verifier could check the OTP and if is not correct, compute the OTP for C+1, C−1, C+2, etc., until a match is found or the size of the window (e.g., within plus or minus 10 of the expected C) is exceeded.

The verifier could implement different level of securities:
 1—simply accept the OTP value in this window; or
 2—require the user to provide another OTP (the OTP will be different even if the time slot is the same because pressing the button (causing the occurrence of an event) will modify the counter value and generate a different OTP from the previous one; or
 3—differentially accept an OTP for some actions, refuse the OTP for others, eventually also accept for the first 2-3 resynchronizations and then ask for another OTP, propose to replace the token and/or inform technical support that there is a synchronization issue with a specific user, etc.

A system in accordance with an embodiment of the present invention is shown in FIG. 1. Token 101 can include a processor 102 coupled to memory 103, display 104, clock 105 and button 106. Memory 103 can store data 107, such as shared secrets, such as a password, a Personal Identification Number (PIN), cryptographic key, etc. Memory 103 can also store counter C and a value based upon public information. Memory 103 can also store instructions 108 adapted to be executed by processor 102 to perform at least part of the method in accordance with the present invention.

Processor 102 can be a general purpose microprocessor or an Application Specific Integrated Circuit that embodies at least part of the method of the present invention in its hardware and/or firmware. An example of a general purpose microprocessor is the Pentium IV processor manufactured by the Intel Corporation of Santa Rosa, Calif. An example of an ASIC is a digital signal processor.

Memory 103 can be any device that can store electronic information. Examples of memory 103 can include Random Access Memory, Read Only Memory, Electronic Programmable Read Only Memory, flash memory, a hard disk, a CD, etc. These are also examples of a medium that can store the instructions 107 and data (e.g., secrets, counter value, etc.)

Button 106 can be any device that can send a signal when it is depressed or otherwise activated by a user. Examples of buttons include membrane-switches, pressure sensors, biometric readers, pressure switches and the like.

Clock 105 can be any device adapted to indicate the passage of time. An example of a clock includes a quartz crystal that emits a well-known frequency that can be used as the basis to change the value of a variable over time in a consistent way. In some embodiments of the present invention, token 101 does not include clock 105, but rather receives a timing signal from a source external to the token 101.

Display 104 can be any device capable of displaying information to a user, such as alphanumeric information. Examples of display 104 include a liquid crystal display, a TFT display, a plasma display, etc. The display 104 can show the OTP to the user.

Figure 2:
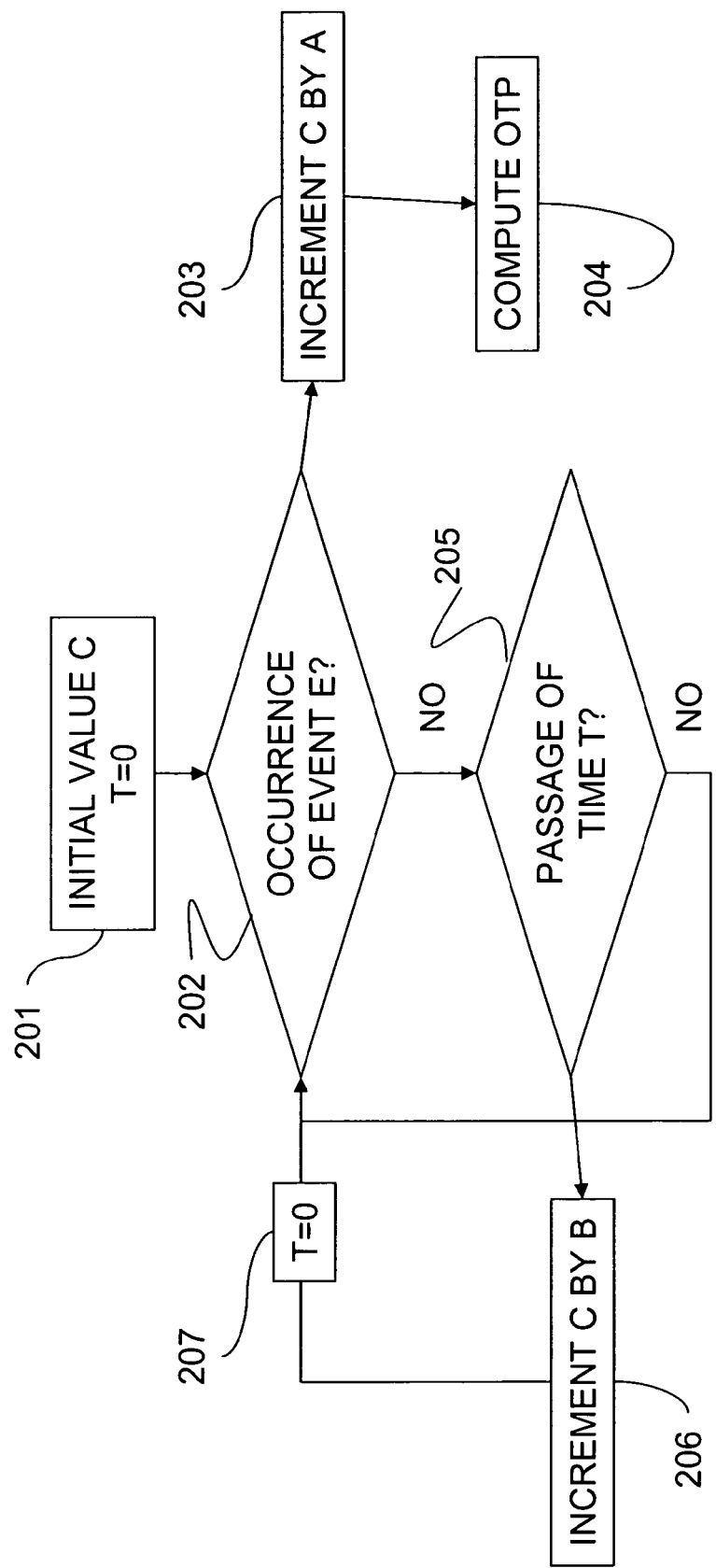
FIG. 2 shows the method in accordance with an embodiment of the present invention.

The method in accordance with an embodiment of the present invention is shown in FIG. 2. Value C is assigned an initial value and time T is set to zero, step 201. If an event E is determined to have occurred, step 202, then C is incremented by an amount B, step 203 and an OTP is computed, step 204. If no event E is determined to have occurred, then it is determined if an amount of time T has passed, step 205. If time T has passed, then C is incremented by an amount B, step 206 and T is reset to zero, step 207.

The foregoing description is meant to illustrate and not limit the scope of the present invention. One of skill in the art will appreciate that many variations beyond the foregoing examples are encompassed by the claims.

What is claimed is:

1. A method comprising:
   at a first time, changing a value of a time and event-based counter (TEC) in response to the passage of time;
   at a second time, changing the value of the TEC in response to an occurrence of an event other than the passage of time, wherein at least one of the changing of the value in response to the passage of time or the changing of the value in response to the occurrence of the event decreases the value of the TEC; and
   determining, by a processor, a one time password based on the changed value of the TEC when the event occurs and not when the passage of time occurs.

2. The method of claim 1, wherein the one time password is further determined based on an adjunct value.

3. The method of claim 2, wherein the adjunct value is based on a cryptographic key.

4. The method of claim 2, wherein the adjunct value is based on a shared secret and public information.

5. The method of claim 1, where the event is the pressing of a button.

6. The method of claim 1, wherein the event is the selection of a dialog box.

7. The method of claim 1, wherein the event is the meeting of a condition.

8. The method of claim 1, wherein the value of the TEC is changed in response to the passage of time after a passage of a predetermined amount of time.

9. The method of claim 1, wherein the value of the TEC is changed by T1 after T seconds.

10. The method of claim 1, wherein the value of the TEC is changed after the occurrence of a predetermined plurality of the events.

11. The method of claim 1, wherein the one time password is computed in accordance with the algorithm specified in RFC 4226.

12. The method of claim 1, further comprising changing the value of the TEC in response to the passage of each of a plurality of separate time intervals.

13. The method of claim 1, further comprising changing the value of the TEC in response to the occurrence of each of a plurality of separate events, each event being of the same type.

14. The method of claim 13, wherein the event type is one of: a button press, a key press, scanning a biometric, selection of a graphical interface element, activation of a computer application program, or activation of a feature of a computer application program.

15. An apparatus to generate a one time password, the apparatus comprising a processor to change a value of a TEC at a first time in response to the passage of time and to change the value of the TEC at a second time in response to the occurrence of an event other than the passage of time, and to compute a one time password based on the value of the TEC when the event occurs and not when the passage of time occurs, wherein at least one of the changing of the value in response to the passage of time or the changing of the value in response to the occurrence of the event decreases the value of the TEC.

16. The apparatus of claim 15, further comprising a memory and a display coupled to the processor.

17. The apparatus of claim 16, wherein the processor is further to cause the display to show the one time password.

18. The apparatus of claim 15, wherein the processor is further to change the value of the TEC by T1 when the processor detects the passage of T seconds.

19. The apparatus of claim 15, wherein the processor is further to change the value of the TEC by E1 when the processor detects the occurrence of an event E.

20. The apparatus of claim 15, wherein the processor is further to compute the one time password in accordance with the algorithm specified in RFC 4226.

21. The apparatus of claim 15, the processor is further to change the value of the TEC in response to the passage of each of a plurality of separate time intervals.

22. The apparatus of claim 15, the processor is further to change the value of the TEC in response to the occurrence of each of a plurality of separate events, each event being of the same type.

23. The method of claim 22, wherein the event type is one of: a button press, a key press, scanning a biometric, selection of a graphical interface element, activation of a computer application program, or activation of a feature of a computer application program.

24. A non-transitory machine-readable storage medium storing instructions to be executed by a processor to compute a one time password based upon a value that is changed at a first time responsive to the passage of time, and the value is also changed at a second time responsive to the occurrence of an event other than the passage of time, wherein the one time password is computed based upon the value when the event occurs and not when the passage of time occurs, and wherein at least one of the changing of the value responsive to the passage of time or the changing of the value responsive to the occurrence of the event decreases the value of the TEC.

25. The medium of claim 24, wherein the one time password is computed based upon an adjunct value.

26. A method of generating a one-time password by a token, comprising:

initializing a counter, the value of the counter being stored in a computer-readable storage medium in the token;

at a first time, changing the value of the counter a first time solely in response to the passage of a time interval;

at a second time, changing the value of the counter based on the occurrence of an event other than the passage of the time interval, wherein at least one of the changing of the value in response to the passage of the time interval or the changing of the value based on the occurrence of the event decreases the value of the counter; and generating, by a processor contained in the token, the one-time password based on the value of the counter when the event occurs and not when the passage of time occurs.

27. The method of claim 26, wherein the one time password is further generated based upon an adjunct value.

28. The method of claim 27, wherein the adjunct value is based upon a shared secret.

29. The method of claim 27, wherein the adjunct value is based upon a shared secret and public information.

30. The method of claim 26, wherein the one time password is generated in accordance with the algorithm specified in RFC 4226.

31. The method of claim 26, further comprising changing the value of the counter in response to the passage of each of a plurality of separate time intervals.

32. The method of claim 26, further comprising changing the value of the counter in response to the occurrence of each of a plurality of separate events, each event being of the same type.

33. The method of claim 32, wherein the event type is one of: a button press, a key press, scanning a biometric, selection of a graphical interface element, activation of a computer application program, or activation of a feature of a computer application program.

* * * * *